United States Patent
Meschke et al.

(10) Patent No.: US 8,087,567 B2
(45) Date of Patent: Jan. 3, 2012

(54) PROCESS FOR THE LOW-DEFORMATION DIFFUSION WELDING OF CERAMIC COMPONENTS

(75) Inventors: Frank Meschke, Buchenberg (DE); Ursula Kayser, Buchenberg (DE); Andreas Rendtel, Kempten (DE)

(73) Assignee: ESK Ceramics GmbH & Co., KG, Kempten (DE)

( * ) Notice: Subject to any disclaimer, the term of this patent is extended or adjusted under 35 U.S.C. 154(b) by 162 days.

(21) Appl. No.: 12/385,608

(22) Filed: Apr. 14, 2009

(65) Prior Publication Data

US 2009/0239007 A1 Sep. 24, 2009

Related U.S. Application Data

(62) Division of application No. 11/224,296, filed on Sep. 13, 2005, now abandoned.

(30) Foreign Application Priority Data

Sep. 16, 2004 (DE) .......................... 10 2004 044 942

(51) Int. Cl.
*B29C 67/04* (2006.01)
*B22F 3/10* (2006.01)
(52) U.S. Cl. .................. 228/193; 264/125; 419/2
(58) Field of Classification Search .................. None
See application file for complete search history.

(56) References Cited

U.S. PATENT DOCUMENTS

| | | | |
|---|---|---|---|
| 3,854,189 A * | 12/1974 | Ezis et al. ................ 156/62.2 |
| 3,887,412 A | 6/1975 | Styhr et al. |
| 3,905,723 A * | 9/1975 | Torti, Jr. .................... 416/241 R |
| 3,954,483 A | 5/1976 | Prochazka |
| 4,055,451 A * | 10/1977 | Cockbain et al. .......... 156/89.27 |
| 4,234,661 A * | 11/1980 | Lee et al. ..................... 428/446 |
| 4,455,385 A | 6/1984 | Prochazka |
| 4,487,644 A | 12/1984 | Gupta et al. |
| 4,579,703 A | 4/1986 | Adlerborn et al. |
| 4,636,434 A * | 1/1987 | Okamura et al. ............. 428/328 |
| 4,643,648 A * | 2/1987 | Huller ...................... 416/241 B |

(Continued)

FOREIGN PATENT DOCUMENTS

DE 23 62 469 A1 6/1975

(Continued)

OTHER PUBLICATIONS

Arons, R. M., Tien, J. K. "Creep and strain recovery in hot-pressed silicon nitride." Journal of Materials Science, 15 (1980): 2046-2058.

*Primary Examiner* — Kiley Stoner
(74) *Attorney, Agent, or Firm* — The Nath Law Group; Jerald L. Meyer; Jiaxiao Zhang

(57) ABSTRACT

A process for joining ceramic components, wherein the components which are to be joined consist of sintered nonoxide ceramic, and the components are brought into contact with one another in a diffusion-welding process in the presence of a shielding gas atmosphere and are joined with little deformation, under the application of a temperature of at least 1600° C., preferably over 1800° C., particularly preferably over 2000° C., and if appropriate a load, to form a monolith, the components which are to be joined experiencing plastic deformation in the direction in which force is introduced of less than 5%, preferably less than 1%.

23 Claims, 7 Drawing Sheets

U.S. PATENT DOCUMENTS

| | | | |
|---|---|---|---|
| 4,762,269 A * | 8/1988 | Gyarmati et al. | 228/194 |
| 4,784,313 A * | 11/1988 | Godziemba-Maliszewski | 228/194 |
| 4,925,608 A | 5/1990 | Rossi et al. | |
| 4,950,558 A * | 8/1990 | Sarin | 428/698 |
| 4,961,529 A * | 10/1990 | Gottselig et al. | 228/124.1 |
| 5,009,359 A * | 4/1991 | Stover et al. | 228/175 |
| 5,035,923 A * | 7/1991 | Sarin | 427/255.15 |
| 5,054,682 A * | 10/1991 | Mistry | 228/194 |
| 5,125,557 A * | 6/1992 | Tanaka et al. | 228/121 |
| 5,197,651 A * | 3/1993 | Nakamura et al. | 228/44.7 |
| 5,451,279 A * | 9/1995 | Kohinata et al. | 156/89.27 |
| 5,683,028 A * | 11/1997 | Goela et al. | 228/121 |
| 5,770,322 A * | 6/1998 | Nishioka et al. | 428/627 |
| 6,187,705 B1 | 2/2001 | Sacks | |
| 6,189,766 B1 * | 2/2001 | Baker et al. | 228/121 |
| 6,586,704 B1 * | 7/2003 | Cockeram et al. | 219/121.64 |
| 7,318,547 B2 * | 1/2008 | Gasse | 228/247 |
| 7,413,109 B2 * | 8/2008 | Goretta et al. | 228/194 |
| 2002/0160902 A1 | 10/2002 | Lesniak et al. | |
| 2005/0175840 A1 * | 8/2005 | Giesler et al. | 428/409 |
| 2009/0151917 A1 * | 6/2009 | Meschke et al. | 165/168 |

FOREIGN PATENT DOCUMENTS

| | | |
|---|---|---|
| DE | 32 07 371 C2 | 12/1982 |
| DE | 39 15 702 C2 | 11/1990 |
| EP | DE-3003186 A1 * | 8/1981 |
| EP | 362594 A * | 4/1990 |
| JP | 58084186 A * | 5/1983 |

* cited by examiner

Fig. 1: Creep rate of SiC materials as a function of temperature
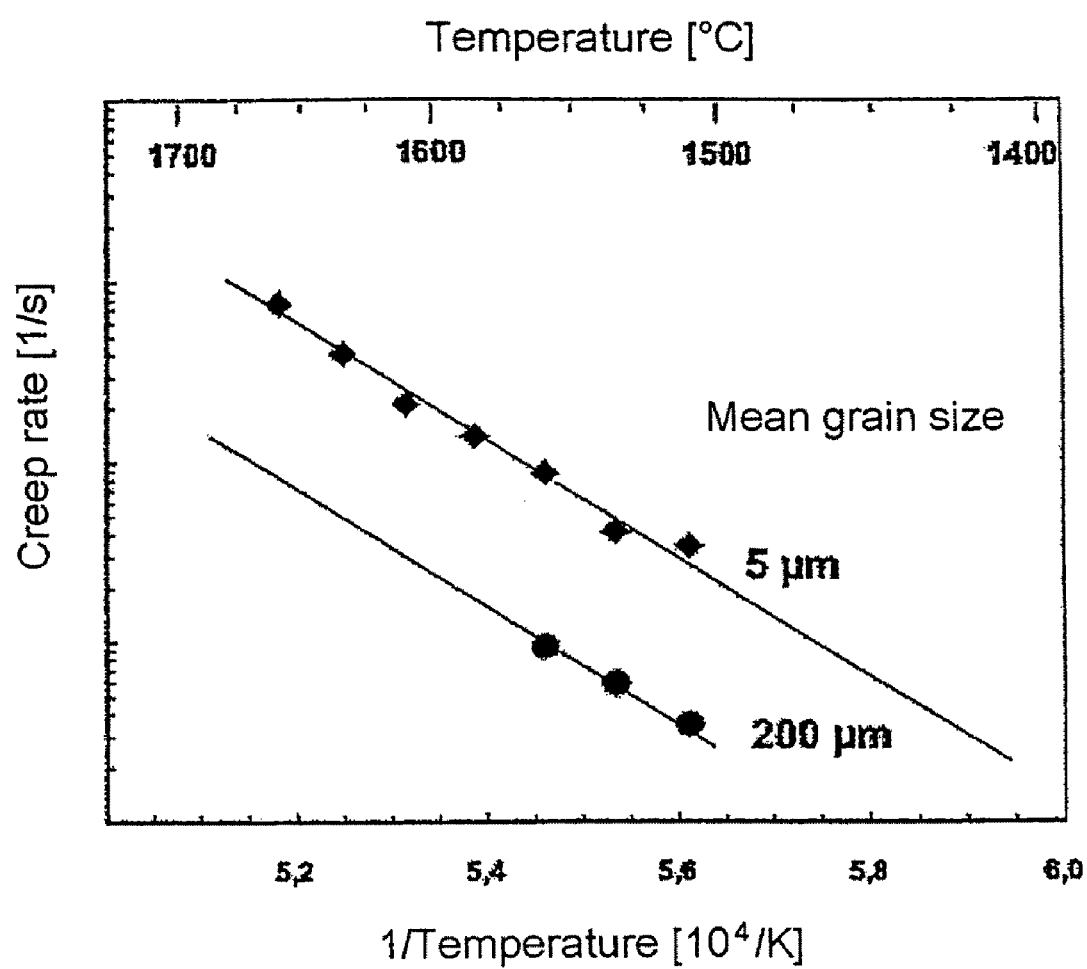

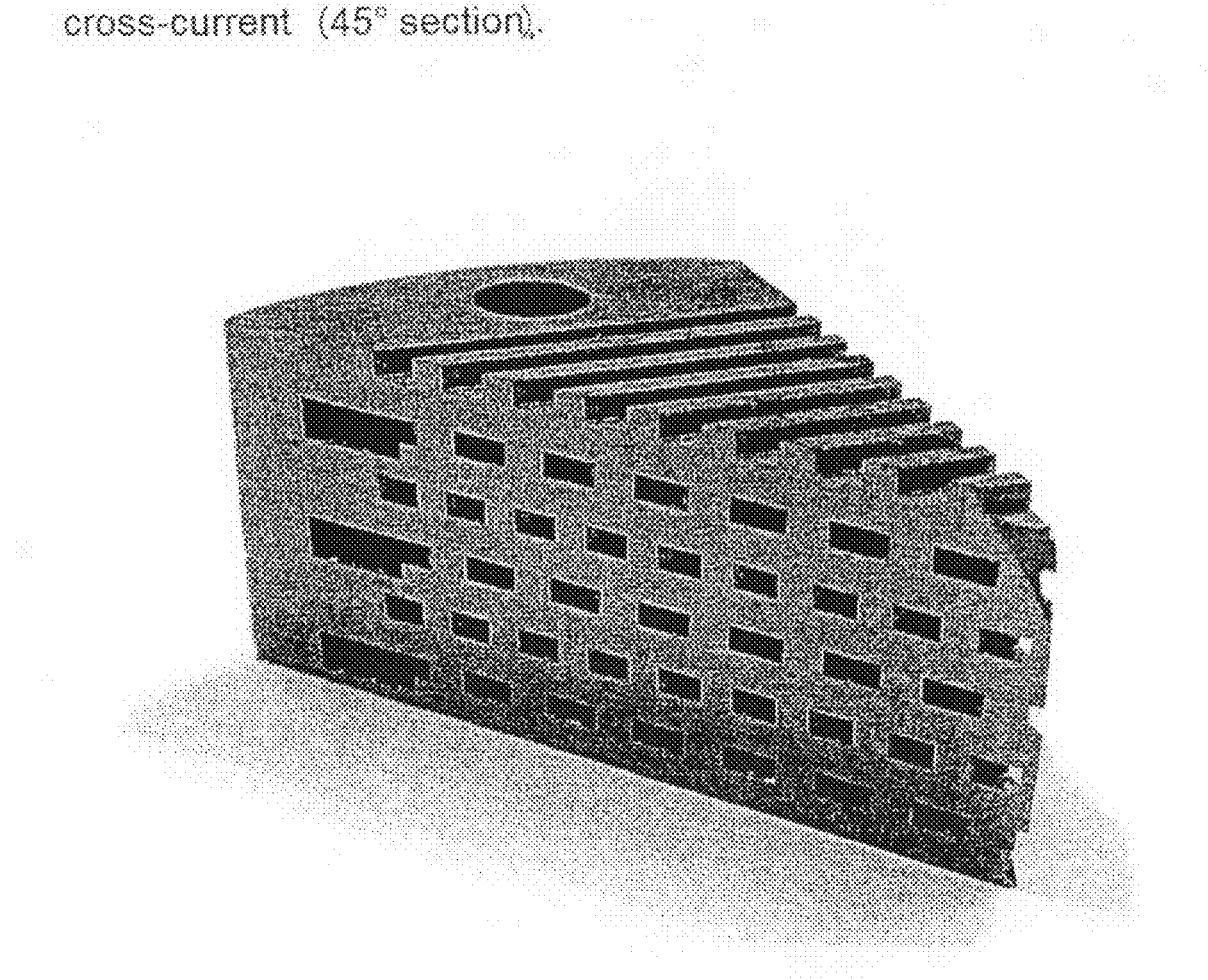
Fig. 2: Monolithic microreactor made from coarse-grained SSiC without seals and seams designed for guiding gases in cross-current (45° section).

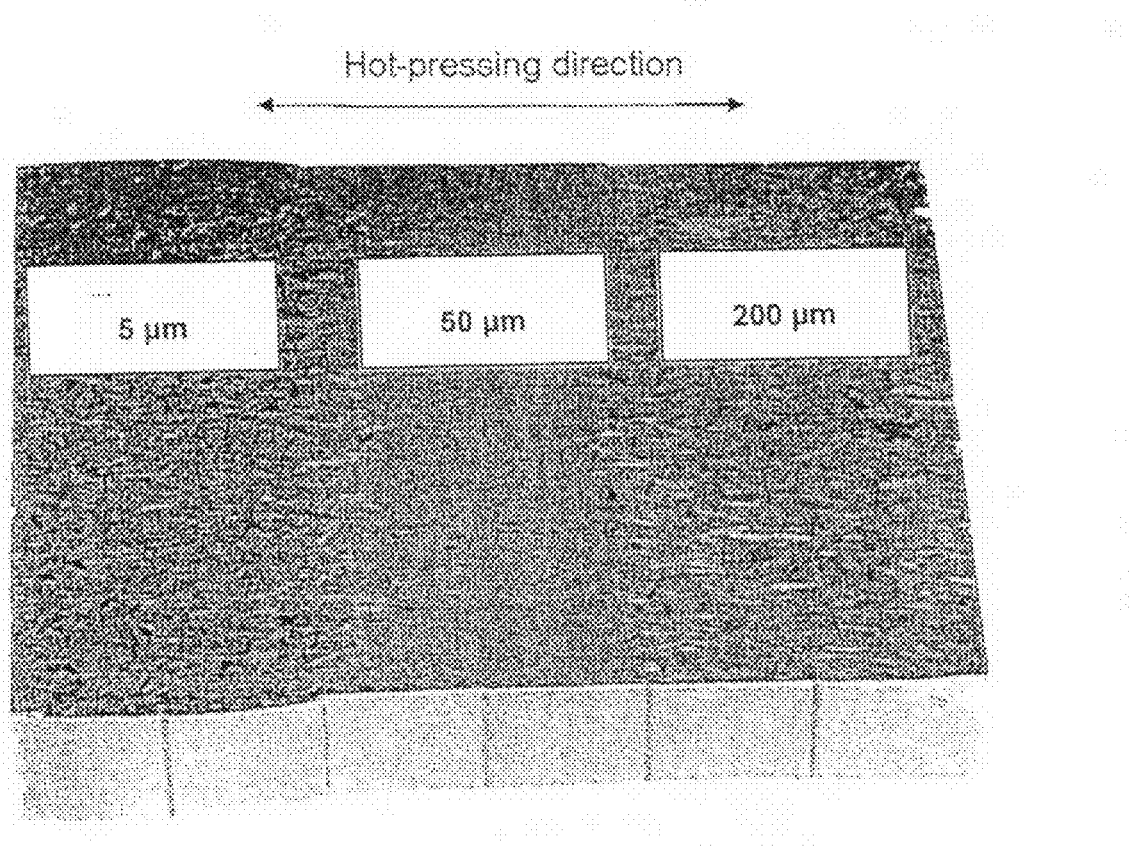
Fig. 3: Monolith joined seamlessly from 6 SSiC components at 2150°C. 3 types of sintered SiC materials were used. Dimensions indicate the initial mean grain size.

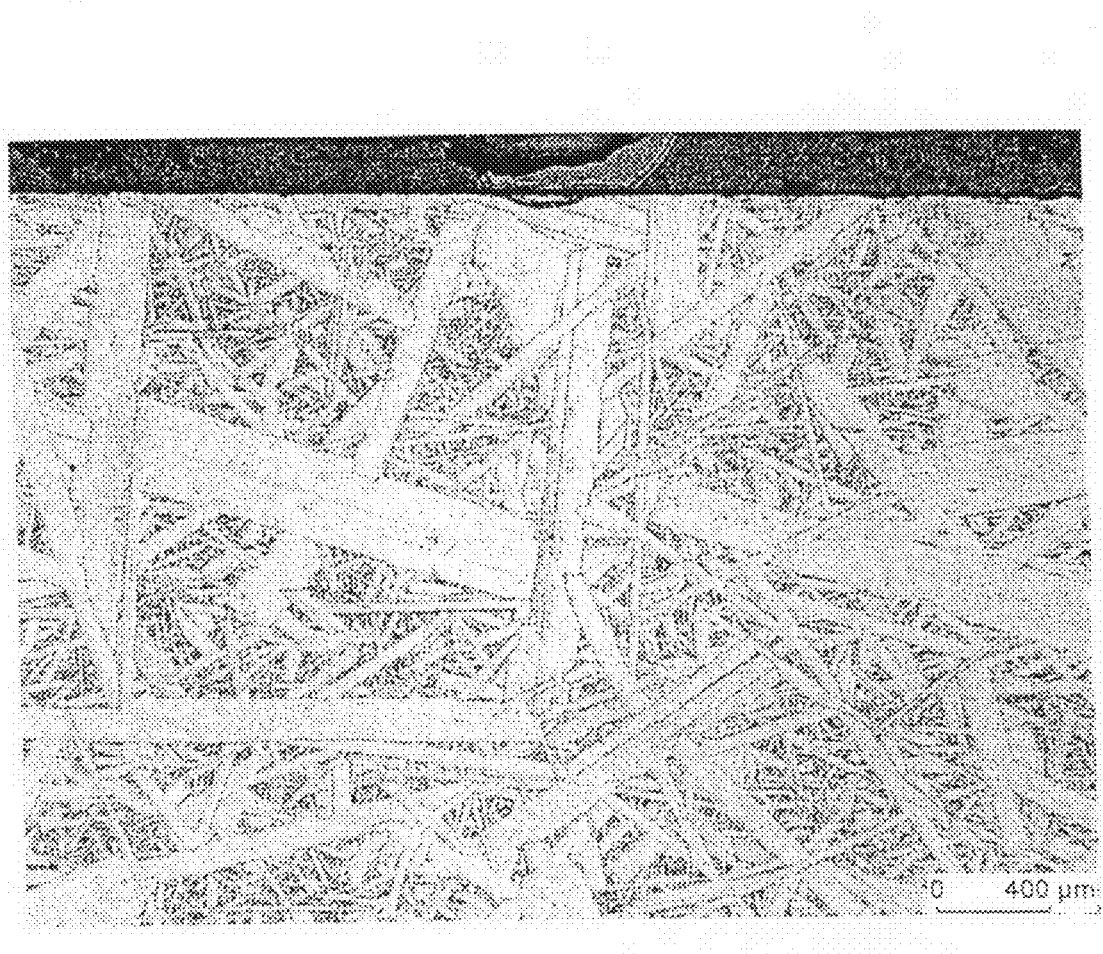
Fig. 4: Seamless join of an SSiC component.

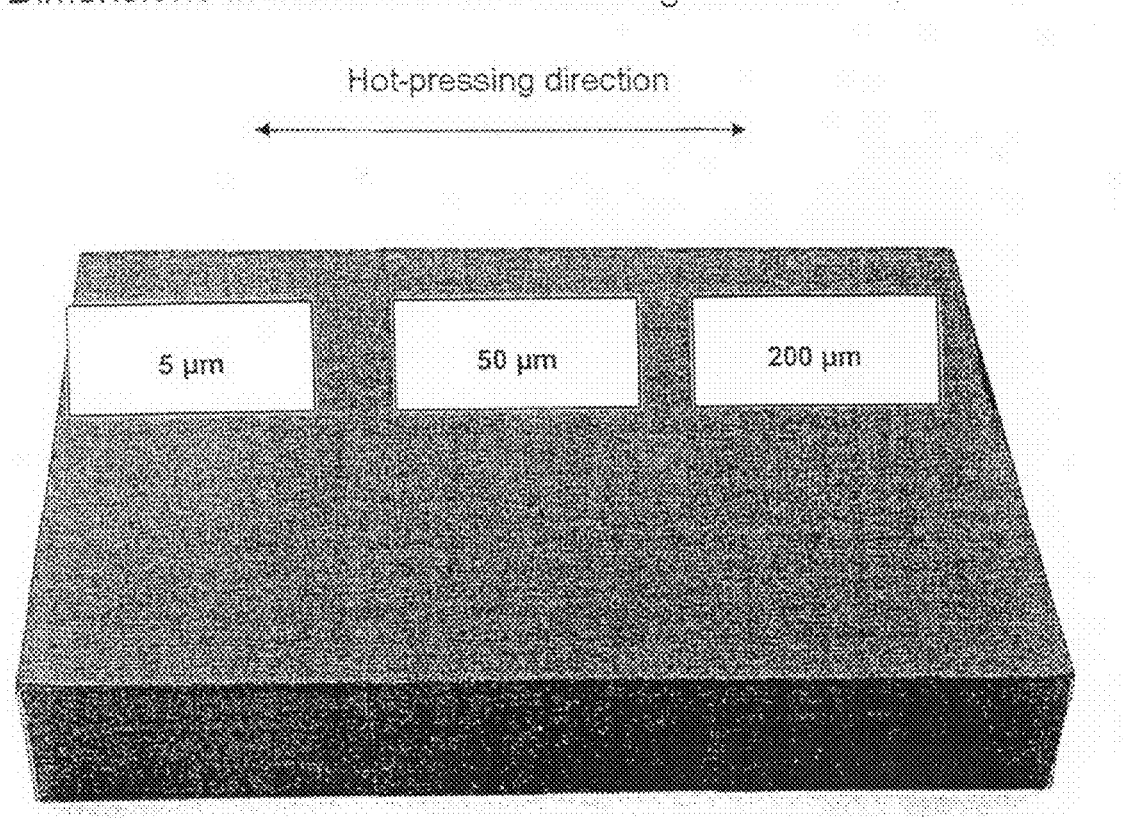
Fig. 5: Component joined seamlessly from 6 SSiC components at 1800°C. 3 types of sintered SiC materials were used. Dimensions indicate the initial mean grain size.

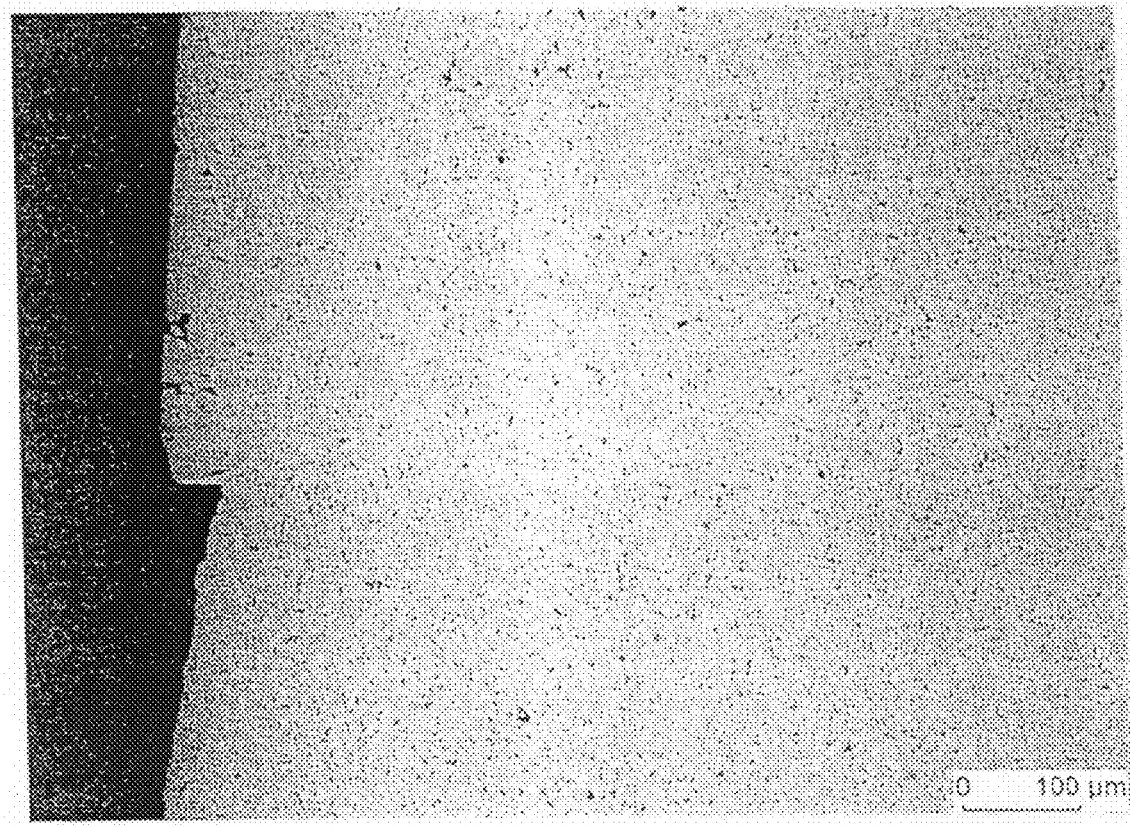
Fig. 6: Polished ground section of a join in a B₄C part diffusion-welded from 2 components.

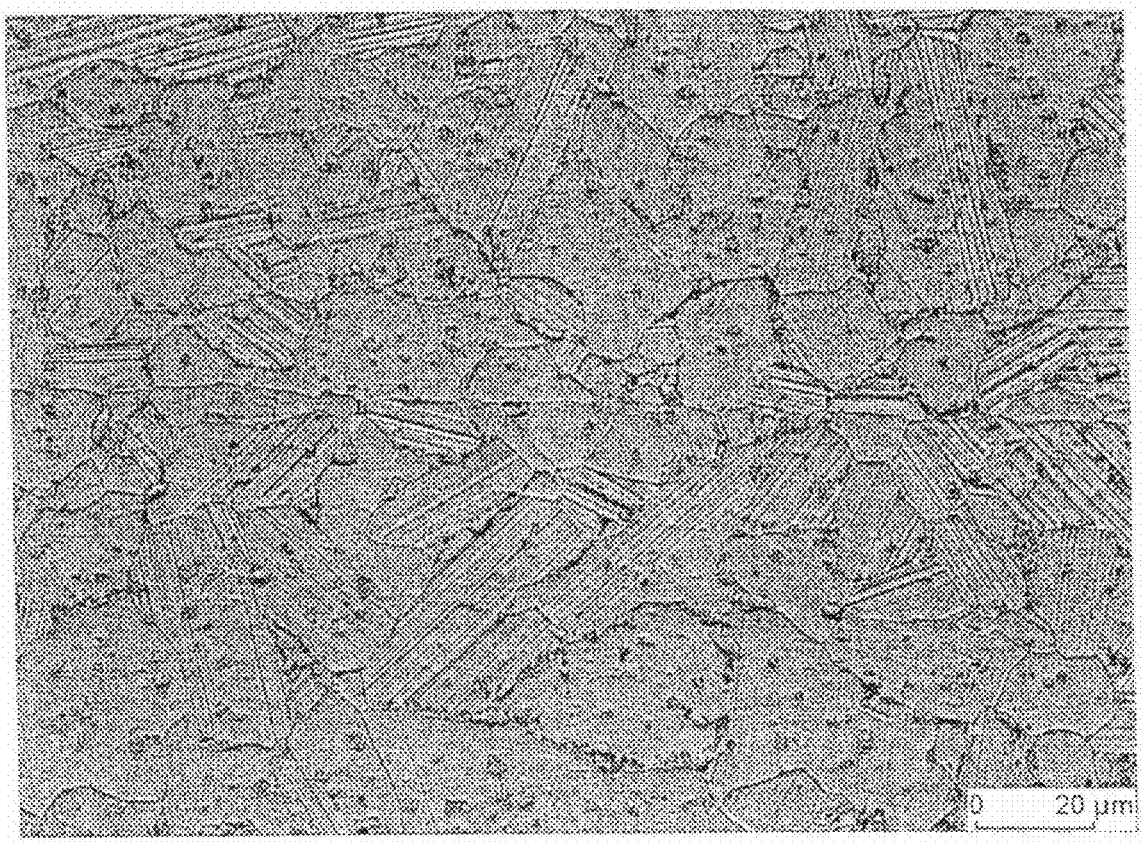
Fig. 7: Etched ground section of a join in a $B_4C$ part diffusion-welded from 2 components.

PROCESS FOR THE LOW-DEFORMATION DIFFUSION WELDING OF CERAMIC COMPONENTS

This is a divisional Application of U.S. Ser. No. 11/224,296, filed Sep. 13, 2005, now abandoned, the entire content of which is hereby incorporated by reference in its entirety.

BACKGROUND OF THE INVENTION

I. Field of the Invention

The invention relates to a process for the low-deformation diffusion welding of ceramic components, to the monoliths produced by this process and to their applications.

II. Description of the Related Art

Ceramic components are in general use in plant and mechanical engineering where wear, corrosion and high thermal loads occur. The hardness, chemical stability and high-temperature stability of ceramics is far superior to the corresponding properties of steels. Moreover, silicon carbide, as a representative of industrial ceramics, has the particular advantage of an extremely good thermal conductivity (four times better than that of steel). This predestines the material not only for use in nozzles, valves, axial face seals and sliding-contact bearings but also for use in reactors, such as for example tube bundle heat exchangers or diesel particulate filters. In many of these applications, the ceramic components have to be of very complex shape for design reasons. The design is often incompatible with available ceramic shaping processes, which makes it necessary to join individual constituents. Consequently, the literature has disclosed numerous works relating to the joining of ceramic, including many relating to the joining of SiC ceramic. Depending on the process, the literature uses the term "diffusion welding", "reaction bonding" or "soldering". Soldering and reaction bonding leave behind a seam in the interface between the joining partners, whereas diffusion welding can be applied in such a way that the joining partners form a seamless component. Seamless components of this type are also described as monoliths.

Fundamental principles on the theme of diffusion welding of sintered SiC components were disclosed by Thomas Moore as early as the 1980s. He demonstrates in the article "Feasibility study of the Welding of SiC" in J. Am. Ceram. Soc. 68 [6] C151-C153 (1985) that a stable, cohesive join between polished planar plates of α-SiC with the aid of diffusion welding is only possible if the temperatures and pressures applied are so high that approximately 25% plastic deformation of the components to be joined in the direction of the pressing pressure has to be accepted. The article concludes that it is not possible to produce a seamless welded join of sintered SiC without plastic deformation. Even after hot-pressing at 1950° C. and 13.8 MPa pressure (time 2 h), there are seams between the joined and considerably deformed plates. A drop in the temperature is not likely to lead to any better results with regard to a seamless join. Increasing the pressure during the diffusion welding to 138 MPa, realized with the aid of hot isostatic pressing, according to the report likewise does not produce a successful join. The inadequate cohesive joining observed between the components is attributed to the insufficient sintering activity of SiC.

U.S. Pat. No. 4,925,608 (1990) describes as a process the diffusion welding of slightly pre-sintered SiC components based on hot isostatic pressing in order to obtain a cohesive, seamless SiC bond. Here, particular emphasis is placed on the β-modification of SiC and the higher sintering activity of the components, which are still up to 85% porous. Temperatures of >1700° C. and pressures of greater than 150 MPa are preferred. Since densification of the porous components still occurs during the joining, correspondingly high degrees of plastic deformation occur.

To keep the overall levels of plastic deformation low yet nevertheless to achieve high-quality joins, the bulk of the works disclosed in the literature concentrate on the "soldering" and "reaction bonding" joining processes at significantly lower temperatures. Nowadays, the state of the art is for ceramic components to be joined with the aid of adhesives at room temperature, to be joined with the aid of metal and glass solders in the region of around approx. 1000° C. or to assemble them into components by reaction bonding at approx. 1400° C. In this context, in particular the reaction bonding of silicon-infiltrated SiC (Si—SiC) should be mentioned, a process which has been used to produce even complex components, such as plate-type heat exchangers, in the past. However, the joining seams are still a weak point of the components. Decomposition, softening or release of silicon, followed by failure, occurs here at an early stage under high thermal, corrosive or wearing loads. Even nowadays, it is considered impossible to join sintered SiC (SSiC) seamlessly and with little deformation.

Therefore, it is an object of the present invention to provide a process which allows components made from a nonoxide sintered ceramic to be joined to one another in such a way that a seamless monolith is formed and the plastic deformations during joining are kept at such a low level that the contours of the monolith already correspond to those of the desired component. There is consequently no need for a subsequent hardworking.

SUMMARY

According to the invention, the object is achieved by virtue of the fact that the components that are to be joined are brought into contact with one another in a diffusion-welding process in the presence of a shielding gas atmosphere and are joined with little deformation, under the application of a temperature of at least 1600° C., and if appropriate a load, to form a monolith, the components which are to be joined experiencing plastic deformation in the direction in which force is introduced of less than 5%, preferably less than 1%.

The diffusion welding is preferably a hot-pressing process.

BRIEF DESCRIPTION OF THE DRAWINGS

The features, nature, and advantages of the present invention will become more apparent from the detailed description set forth below when taken in conjunction with the drawings in which like reference characters identify corresponding items throughout and wherein:

FIG. 1 is a graph, illustrating creep rate of SiC materials as a function of temperature.

FIG. 2 is a photomicrograph showing a microreactor formed in a joining cycle, formed of a coarse-grained SSiC.

FIG. 3 is a photomicrograph showing a polished ground section of a monolith joined from 6 components.

FIG. 4 is a photomicrograph showing coarse-grained SSiC components, in which the grains of the two plates grow into one another and thereby dissolve the component interface.

FIG. 5 is a photomicrograph showing a polished section of the microstructure.

FIG. 6 is a photomicrograph showing the polished ground section of the component.

FIG. 7 is a photomicrograph showing a plane of adjacent grain boundaries after an etching treatment to uncover interfaces.

DETAILED DESCRIPTION OF THE INVENTION

In materials science, the resistance to plastic deformation in the high-temperature range is referred to as the high-temperature creep resistance. What is known as the creep rate is used as a measure of the creep resistance. Surprisingly, it has been found that the creep rate of the materials to be joined can be used as a central parameter for minimizing the plastic deformation in a joining process for the seamless joining of sintered ceramic components.

Most commercially available sintered SiC materials (SSiC) have similar microstructures with a monomodal grain size distribution and a grain size of approx. 5 µm. They therefore have a sufficiently high sintering activity at the abovementioned joining temperatures of >1700° C. However, they also have a comparable creep resistance, which is too low for low-deformation joining. Consequently, hitherto a high degree of plastic deformation has always been observed in successful diffusion-welding processes. Since the creep resistance of the SSiC materials in general does not differ significantly, the creep rate has not hitherto been considered a variable parameter which can be used for the joining of SSiC.

It has now been found that the creep rate of SSiC can be varied over a wide range by varying the microstructure formation. Low-deformation joining for SSiC materials can only be achieved by the use of certain types.

The creep resistance of ceramic materials can generally be increased considerably by two strategies:

Coarsening the microstructure. If a microstructure is coarsened, the diffusion path which is required for the mass transfer taking place in the creep process is considerably lengthened and therefore drastically slows the creep rate. The literature describes a reciprocal relationship with the grain size to the power of three. This relationship has been extensively documented for materials such as aluminum oxide and silicon nitride.

Nanoparticles. Nanotechnology can be used to obtain ceramic nanoparticles which, when used in the grain boundaries of a ceramic, considerably slow the creep rate of the ceramic at high temperature and optionally under load. By way of example, the creep rate [unit 1/s], referred to as deformation rate, of aluminum oxide, as a representative example of oxide ceramic, can be reduced by two orders of magnitude by doping with nano-SiC particles. Similar effects have also been determined for silicon nitride materials, and conceivably also apply to all nonoxide ceramics.

Both strategies are equally suitable for producing creep-resistant materials with a sintering activity and to allow low-deformation joining of components produced therefrom.

It is preferable for at least one of the components that are to be joined to consist of a material whereof the creep rate in the joining process is always lower than $2 \cdot 10^{-4}$ 1/s, preferably always lower than $8 \cdot 10^{-5}$ 1/s, particularly preferably always lower than $2 \cdot 10^{-5}$ 1/s.

The ceramic material is preferably selected from the group consisting of titanium diboride, boron carbide, silicon nitride, silicon carbide and mixtures thereof.

It is preferable for at least one of the components that are to be joined to be sintered silicon carbide (SSiC) with a bimodal grain size distribution and a mean grain size of greater than 5 µm, in which case the material may contain further material components amounting to up to 35% by volume, preferably less than 15%, particularly preferably less than 5%, such as for example graphite, boron carbide or other ceramic particles, preferably nanoparticles.

Sintered SiC with a bimodal grain size distribution which is particularly suitable for the process according to the invention is SSiC with a mean grain size of greater than 5 µm, preferably greater than 20 µm, particularly preferably greater than 50 µm. The mean grain size of the material is therefore higher by a factor of 10-100 than that of conventionally sintered, fine-grained SiC with a mean grain size of just approx. 5 µm. What is known as coarse-grained sintered silicon carbide (SSiC) for this reason has a considerably higher creep resistance than fine-grained SSiC. The literature does not give any details as to creep rates of modern SiC materials of this type. FIG. 1 illustrates the lower creep rate of a coarse-grained SSiC (mean grain size approx. 200 µm) for various temperatures and compares it under identical load conditions to a fine-grained SSiC variant (mean grain size 5 µm), which is marketed, for example, under the name EKasic® F by ESK Ceramics GmbH & Co. KG.

The process according to the invention is preferably carried out at a temperature of >1600° C., in particular >1800° C., particularly preferably >2000° C. The process is preferably carried out at a pressure of >10 kPa, preferably >1 MPa, particularly preferably >10 MPa. The temperature-holding time is preferably at least 10 min, particularly preferably at least 30 min.

The process according to the invention can be used to produce ceramic components of complex shape to form near net shape components for plant and mechanical engineering with an extremely high thermal stability, corrosion resistance or wear resistance. Reactors in which the seals or solder seams have hitherto formed the weak points can now be produced as a seamless monolith.

Consequently, the process can be used, for example, to produce plate-type heat exchangers from sintered SiC ceramic with an extremely high thermal stability and corrosion resistance. Plate-type heat exchangers have already been produced by reaction bonding from Si-infiltrated SiC ceramic (Si—SiC). The corrosion resistance, which is not universal, however, constitutes a considerable restriction on the possible applications.

Filters and in particular ceramic microreactors can now likewise be produced as a monolith from sintered SiC ceramic. In particular microreactors with channels designed for cross-current can now also be formed as a SSiC monolith.

Further applications may also include heating elements made from electrically conductive SSiC ceramic, for example for furnaces and reactors.

Linings, impact protection means or first wall components for fusion reactors are also conceivable. Other highly creep-resistant components of complex shape for high-temperature technology, such as furnace rolls, furnace holding means and burner components, can also be formed. More or less complex structural components, such as deformation tools, plates, tubes, flanges or hermetically sealed containers, can in this way be joined from insulating or electrically conductive nonoxide ceramic.

Since the present process for the first time makes it possible to provide corresponding components with a seamless join, the invention also relates to components made from a nonoxide ceramic with at least one seamless join.

It is preferable for the component to have a bending rupture strength of >150 MPa, particular preferably >250 MPa, measured using the 4-point method, at the seamless join.

The bending rupture strength of the components according to the invention is particularly preferably just as high in the region of the seamless join as in the base material of the component.

The component is preferably a structural component or functional component, preferably a container, tube, reactor, lining, valve, heat exchanger, heating element, plating, a wearing component, such as a sliding-contact bearing or an axial face seal, a brake, a clutch, a nozzle or a deformation tool.

The invention also relates to the use of components produced by the process according to the invention as structural components and functional components, including containers, reactors, linings, valves, heat exchangers, deformation tools, nozzles, platings.

It is particularly advantageous if said components consist of particularly coarse-grained SSiC-ceramic (mean grain size >50 μm). Not only is the low-deformation joining then easier, but also the corrosion resistance of the components is considerably improved as a result.

The following examples serve to further explain the invention.

Example 1

Diffusion Welding of Coarse-Grained SSiC Components

Polished plates with dimensions of 50×35×5 mm made from sintered coarse-grained SiC (mean grain size approx. 200 μm) are put on top of one another in a hot press to form a stack. A joining cycle using a nitrogen atmosphere, a temperature of 2150° C., a load of 11.4 MPa and a holding time of 45 min leads to plastic deformation in the direction in which force is introduced at less than 1%. The joined component represents a seamless monolith. The creep rate of this SSiC material is less than $2 \cdot 10^{-5}$ 1/s at 2150° C.

This joining cycle can be used, for example, to produce a microreactor as shown in FIG. 2 as a monolith. The ground section at 45° to the channel direction reveals that the monolith consists homogeneously of a coarse-grained SSiC, the channels do not have any deformation and there are no seams.

Example 2

Diffusion Welding of Components Made from Different Types of SSiC

Polished plates with dimensions of 50×35×5 mm made from different sintered SiC grades are placed on top of one another in a hot press to norm a stack. In each case 2 plates made from coarse-grained (mean grain size approx. 200 μm), fine-grained SSiC material (mean grain size approx. 5 μm) and 2 plates made from an SSiC composite material with an initial medium grain size (approx. 50 μm) are used for the monolith that is to be joined. The stack is subjected to a load of 11.4 MPa for 45 min under a nitrogen atmosphere at a temperature of 2150° C.

FIG. 3 shows the polished ground section of the monolith joined from 6 components. Plastic deformation of approx. 15% parallel to the direction in which force is introduced is present in the component only where fine-grained SiC material was initially present (2 plates in the left-hand part of the figure). The coarse-grained SiC material (2 plates in the right-hand part of the figure) and also the SSiC material with a medium grain size (2 plates in the middle) remain dimensionally stable (deformation <1%) during joining. This example demonstrates that even components made from selected different SiC grades can be joined to one another seamlessly and with little deformation to form a monolith.

The polished ground section shown does not reveal a boundary under the microscope at any of the joins. Even etching of the ground section, which uncovers the grain boundaries, does not reveal a seam. Instead, as can be seen in FIG. 4 on the basis of the coarse-grained SSiC components, the grains of the two plates grow into one another and thereby dissolve the component interface. The same phenomenon occurs at the joins formed between pairs of the same material and at the joins between SiC components of different types. A very high mechanical strength results from the good joining. The strength of a bending bar produced from the component exceeds 290 MPa in the 4-point bending test.

Moreover, FIG. 3 illustrates that the microstructures of all three SSiC materials become coarser during this joining cycle at a very high temperature.

Example 3

Diffusion Welding of Components Made from Different Types of SSiC

In accordance with the present invention, polished plates with dimensions of 50×35×5 mm made from different sintered SiC grades were placed on top of one another in a hot press to form a stack. In each case 2 plates of coarse-grained (mean grain size approx. 200 μm), fine-grained SSiC material (mean grain size approx. 5 μm) and 2 plates of an SSiC composite material with an initial medium grain size of approx. 50 μm are used for the monolith that is to be joined. Compared to Example 2, the stack is subjected to a lower temperature of 1800° C. under a nitrogen atmosphere, once again using a load of 11.4 MPa for 45 min.

The creep rate of the fine-grained SSiC at this temperature is sufficiently low for low-deformation joining of all the SSiC components to one another. All the SSiC grades, including the fine-grained SSiC, have a plastic deformation in the direction in which force is introduced of less than 1%. The creep rate of all the SSiC materials is less than $2 \sim 10^{-5}$ 1/s at 1800° C.

Despite the low temperature, microscopic examination does not reveal any joining seam at the polished ground section shown in FIG. 5. There is no coarsening of the microstructure. The grains do not grow together. Instead, the joining cycle converts the component interfaces into a grain boundary which is part of a polycrystalline monolith. After an etching treatment to uncover interfaces, a plane of adjacent grain boundaries can be discerned. The components therefore form a monolith. The strength of the join exceeds 200 MPa.

Example 4

In Situ Coarsening and Diffusion Welding of Fine-Grained SiC Components

Polished plates with dimensions of 50×35×5 mm made from fine-grained, sintered SSiC (mean grain size approx. 5 μm) are placed on top of one another in a hot press to form a stack. The application of a joining cycle with a temperature of 2150° C. and a nitrogen atmosphere, in which the material is converted by in situ conditioning for 30 min into a coarse-grained SSiC with a mean grain size of 50 μm even before the application of the maximum load of 11.4 MPa, after a holding time of 45 min under load leads to plastic deformation of less than 1% in the direction in which force is introduced. The creep rate of this SSiC material which has been coarsened in situ is less than $2 \cdot 10^{-5}$ 1/s at 2150° C.

Example 5

Diffusion Welding of Boron Carbide with Grain Boundary Particles

Polished plates (50*50*6 mm) made from a particle-reinforced boron carbide are placed on top of one another in a hot press to form a stack. A joining cycle of 2150° C. using a nitrogen atmosphere, a load of 8 MPa and a holding time of 45 min leads to plastic deformation of 5% in the direction in which force is introduced. The creep rate of this material at 2150° C. is less than $8 \cdot 10^{-5}$ 1/s.

The resulting component is a seamless monolith. FIG. 6 shows the polished ground section of the component. Microscopic examination does not reveal any seams at the join. The grains of components facing one another do not grow together. Instead, the joining cycle converts the component interfaces into a grain boundary which forms part of a polycrystalline monolith. A plane of adjacent grain boundaries can be seen after an etching treatment to uncover interfaces (FIG. 7).

Comparative Example 6

Diffusion Welding of Fine-Grained SSiC Components

Polished plates made from sintered SiC (mean grain size approx. 5 μm) with dimensions of 50×35×5 mm are placed on top of one another in a hot press to form a stack. The use of a joining cycle at a temperature of 2150° C., under a nitrogen atmosphere, a load of 11.4 MPa and with a holding time of 10 min leads to a strongly plastically deformed component with a plastic deformation of approx. 12% in the direction in which force is introduced. The creep rate of this SiC material is approx. $2 \cdot 10^{-4}$ 1/s at 2150° C.

The invention claimed is:

1. A process for joining ceramic components, wherein the components which are to be joined comprise sintered nonoxide ceramic, and the components are brought into contact with one another in a diffusion-welding process in the presence of a shielding gas atmosphere and are joined, under the application of a temperature of at least 1600° C., to form a monolith, the joined components experiencing plastic deformation in the direction in which force is introduced of less than 5%.

2. The process as claimed in claim 1, wherein the diffusion welding used is a hot-pressing process.

3. The process as claimed in claim 1, wherein at least one of the components to be joined comprises a nonoxide ceramic which during the joining process has a creep rate which is always lower than $2 \cdot 10^{-4}$ 1/s.

4. The process as claimed in claim 1, wherein at least one of the components to be joined of comprises titanium diboride, boron carbide, silicon nitride, silicon carbide or mixtures thereof.

5. The process as claimed in claim 4, wherein at least one of the components to be joined comprises coarse-grained sintered silicon carbide with a bimodal grain size distribution and a mean grain size of greater than 5 μm, which may contain up to 35% by volume of other material components, including graphite, boron carbide or other ceramic particles.

6. The process as claimed in claim 1, which is carried out at a temperature of >1600° C., and a load of >10 kPa.

7. A method of using a structural component or a functional component, including as a container, tube, reactor, lining, valve, heat exchanger, heating element, plating, a wearing component, a clutch, a nozzle or a deformation tool which comprises utilizing the component produced by the process of claim 1.

8. The process as claimed in claim 1, wherein the components are joined under application of a temperature exceeding 1800° C.

9. The process as claimed in claim 8, wherein the components are joined under application of a temperature exceeding 2000° C.

10. The process as claimed in claim 1, wherein the components are joined under the application of a load.

11. The process as claimed in claim 1, wherein the plastic deformation experienced is less than 1%.

12. The process as claimed in claim 3, wherein the creep rate is always lower than $8 \cdot 10^{-5}$ 1/s.

13. The process as claimed in claim 12, wherein the creep rate is always lower than $2 \cdot 10^{-5}$ 1/s.

14. The process as claimed in claim 4, wherein the components to be joined consist of silicon carbide and at least one of titanium diboride, boron carbide, and silicon nitride or mixtures thereof.

15. The process as claimed in claim 5, wherein the mean grain size is greater than 20 μm.

16. The process as claimed in claim 15, wherein the mean grain size is greater than 50 μm.

17. The process as claimed in claim 6, which is carried out at a temperature exceeding 1800° C.

18. The process as claimed in claim 17, which is carried out at a temperature exceeding 2000° C.

19. The process as claimed in claim 6, which is carried out at a load exceeding 1 MPa.

20. The process as claimed in claim 19, which is carried out at a load exceeding 10 MPa.

21. The process as claimed in claim 6, which is carried out with the temperature-holding time exceeding a duration of 10 minutes.

22. The process as claimed in claim 21, which is carried out with the temperature-holding time exceeding a duration of 30 minutes.

23. The process as claimed in claim 7, wherein the wearing component is a sliding-contact bearing or axial face seal.

* * * * *